April 12, 1966      K. D. KRYTER      3,246,285
METHOD OF AND APPARATUS FOR SIGNAL-INFORMATION DETECTION
Filed April 24, 1963
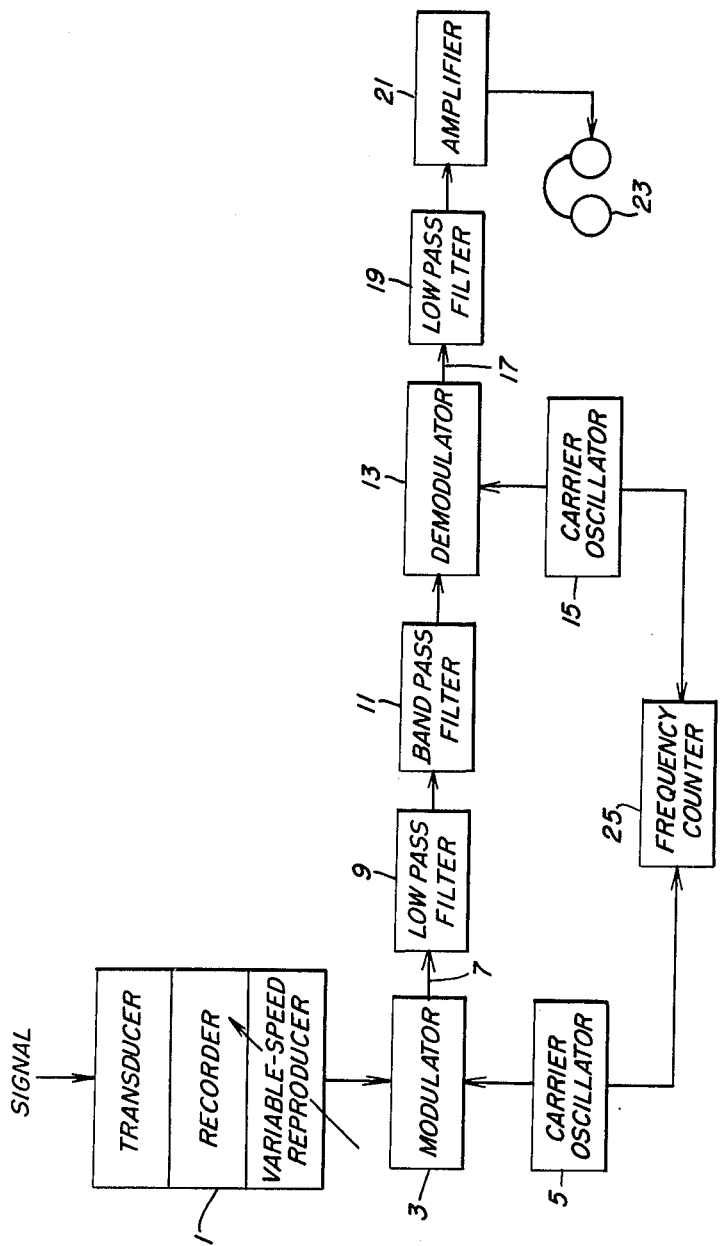
INVENTOR
KARL D. KRYTER
BY    *Rines and Rines*
ATTORNEYS United States Patent Office 3,246,285
Patented Apr. 12, 1966

3,246,285
METHOD OF AND APPARATUS FOR SIGNAL-INFORMATION DETECTION
Karl D. Kryter, Wellesley, Mass., assignor to Bolt Beranek and Newman Inc., Cambridge, Mass., a corporation of Massachusetts
Filed Apr. 24, 1963, Ser. No. 275,397
10 Claims. (Cl. 340—1)

The present invention relates to methods of and apparatus for detecting signal information; and, more particularly, to the detection of meaningful information, such as modulations or "signatures" inadvertently or deliberately generated in, for example, electromagnetic or acoustical signal transmissions as a result of various types of explosions both in the ground or in the air, the passage of objects through the transmission media, large heat sources, and other phenomena.

Unfortunately, the information contained in such modulations often cannot be readily detectable by the human listener or observer, either auditorially, or visually, as by means of graphs, oscilloscope tracings, etc. As an illustration, a subaudible acoustic signal in the band from 0 to 20 c.p.s. cannot usually be audibly detected. Such a signal, moreover, can occur over such a brief interval of time that, again, it cannot be readily detected. The information of interest may thus actually occur in parts of the frequency spectrum or during time intervals that are not compatible or not as compatible as possible with the characteristics of the human eye and/or ear.

It is to the solution of this problem of detecting such signal information, that the present invention is primarily directed; it being understood, however, that the invention is also equally applicable to the detecting of signal information that, in its natural state of occurrence, is not readily susceptible of detection by various types of physical apparatus, also.

An object of the present invention, accordingly, is to provide a new and improved apparatus for and method of detecting signal information otherwise not readily detectable that enables the utilization of information contained in electromagnetic, acoustic and other signals incompatible or partially incompatible with the characteristics of the auditory or visual systems, or the limitations of particular kinds of detecting apparatus.

Other and further objects will be explained hereinafter and will be more particularly pointed out in connection with the appended claims. In summary, however, the invention contemplates the combination of means for receiving signal information comprising a frequency or band of frequencies occurring over predetermined time intervals and for manipulating the frequency or band of frequencies and the time intervals involved so that the detection and interpretation of the information, not readily or satisfactorily detected or interpreted, is made possible or improved. A first carrier frequency generator is provided for connection to a modulator that receives the signal information, producing side bands indicative of the signal information. The desired side band is selected by filter means in the output of the modulator and is fed to a demodulator to which a second carrier frequency is applied; the second carrier frequency being adjusted so that, when the signal information is being received, demodulator side bands result, one of which comprises a representation of at least a portion of the said band of frequencies of the signal information transposed to a readily detectable frequency. That one side band is then selected. Means is further provided for changing artificially the effective time over which the signal information is received and applied to the modulator means and for simultaneously changing the actual values of the frequencies of the band of frequencies comprising the signal information. Preferred details are hereinafter set forth.

The invention will now be described in connection with the accompanying drawing, the single figure of which is a block diagram illustrating the invention, in preferred form, as applied to the detection of signals not otherwise readily detectable.

The received signal information to be detected may be transduced into electrical signals, as by recording the same upon a magnetic tape recorder 1, the reproducing mechanism of which is, in accordance with the present invention, of variable speed. The apparatus 1, in the case of an acoustic echo-receiving system, for example, may comprise a microphone or other acoustic-to-electrical-signal transducer in the input of the recorder portion thereof, positioned to receive subterranean acoustic blast echos from deposits-to-be-identified. Clearly, other types of signal sources having similar characteristics may readily be employed as the signal-information-receiving mechanism. As an illustration, let it be assumed that the signal information is an acoustic echo from an explosion having one or more frequencies within the subaudible band of from 0 to 20 c.p.s. and occurring over a ½-second predetermined time interval. This audibly undetectable signal is fed from the receiving or recording mechanism 1 to a conventional suppressed carrier modulation system comprising a conventional modulator 3, to which the oscillations from a first carrier frequency oscillator 5 are also fed. The carrier frequency is selected at a value remote from or outside the band of frequencies of the signal information; in the illustrated example, this may be a radio-frequency carrier of, say 100,000 c.p.s.

There will then result at the output 7 of the modulator 3, side bands superposed upon the carrier indicative or representative of the echo signal information. A desired side band (say, 100,000–100,202 c.p.s.) may be selected by the removal of the other side band through an appropriate low-pass filter 9. Other intelligence and noise signals in bands outside the desired side band may be eliminated, if desired, through the utilization of a band-pass filter 11, with the selected side band being fed to a demodulator 13 of any desired concentional type. The demodulator 13 also receives an input from a second carrier-frequency generator or oscillator 15, the frequency of which is selected to provide a readily detectable side band in the neighborhood of a frequency to which it is desired to transpose the signal information. In the illustrated example, this frequency may be of the order of 200 c.p.s. which can be readily heard, and the oscillator 15 may accordingly be adjusted to produce a second carrier frequency of 99,800 c.p.s. Appropriate adjustment of the oscillators 5 and 15 to the desired carrier frequencies may be monitored by a frequency counter 25 connected between the oscillators 5 and 15.

When the signal information is received at 1 and is fed to the modulator 3, there will result in the output 17 of the demodulator 13, demodulated side bands, one of which comprises a representation of at least a component of the original-signal informatin such as a part of the band of frequencies of the signal information, but transposed to a frequency range or region near the said readily detectable frequency; that is, in the example given, 200–220 c.p.s. This desired side band is selected by an appropriate further low-pass filter 19 and may be amplified, as at 21, and fed to audible detecting apparatus, schematically shown by the earphones 23.

In the detection of this otherwise substantially undetectable signal information, it is also frequently necessary that the signal information or a part thereof be presented over a different time interval than the actual real-time interval during which the information occurs. If, in the illustrated example, the ½ second interval is not long enough to permit suitable observation and/or interpretation, a 1-second or 2-second artificially produced time duration of the signal information may be effected, in accordance with the present invention, by respectively halving and quartering the reproducing speed of the tape reproducer 1. This operation has the further beneficial effect of simultaneously halving and quartering, respectively, the actual band of frequencies from the original signal information that appears in the output of the demodulator 13. Having the speed of reproduction at 1 will thus produce, in the above example, 100–110 c.p.s. over an artificially lengthened time interval of 1 second and 50–55 c.p.s. over an artificially lengthened time interval of 2 seconds, respectively. The reduced bandwidth of 10 c.p.s. and 5 c.p.s., respectively, has an advantage, in some instances, of providing a more distinct tonal characteristic to the signal information which may assist in proper identification thereof. Other speed variations can also obviously be effected with other types of apparatus, it being a further feature of the invention that the controls for the frequency transposition and the time-duration variation are mutually independent.

In some instances, it may be that it is desired to present the frequency-transposed signal information in a briefer period of time than real-time of occurrence thereof. This can be effected by speeding up the rate of reproduction of the apparatus 1. A doubling of the speed, for example, will produce at the output 17 of the demodulator 13 a detectable signal of 400–440 c.p.s. (a greater bandwidth of 40 c.p.s. than the original 20 c.p.s. bandwidth of the signal information) over a briefer time interval of ¼ of a second.

Experimental tests of the combined but independent frequency transposition and time-changing procedures of the invention have proven the improved detectability features thereof. An almost audibly undetectable and certainly uninterpretable series of 1-second bursts of 50 c.p.s. frequency was rendered readily audibly detectable by transposition to a frequency of 4000 c.p.s. with the accompanying band of noise having a center frequency of 4000 c.p.s. A reduction in speed of tape reproduction from 15 inches/second to 3¾ inches/second resulted in 4-second signals of very audible pitch with center frequency of about 1000 c.p.s. and with a tonal quality lacking in the original signal. This latter quality made the band of noise stand out, being readily detectable as a result of the time stretching that reduced the bandwidth by a factor of 4. Mere time stretching without frequency transposition, as well, did not enable the attainment of these results in this test.

Further modifications will occur to those skilled in the art and all such are considered to fall within the spirit and scope of the invention as defined in the appended claims.

What is claimed is:

1. Apparatus for detecting signal information comprising a frequency or band of frequencies occurring over a time interval and otherwise not readily identifiable, having, in combination, means for receiving the signal information, means for receiving the signal information, means for generating a first carrier frequency remote from the signal information frequency or frequencies, a modulator connected to the receiving and generating means for modulating the carrier with side-bands representative of the signal information, means connected with the modulator for selecting a desired side-band, means for generating a second carrier frequency differing from the first carrier frequency by a readily detectable frequency, demodulator means connected to the selecting means and the second carrier-frequency-generating means to produce, when the signal information is received, demodulated side-bands one of which comprises at least a component of the signal information frequency or frequencies transposed to a frequency region near the said readily detectable frequency, means for selecting the said one demodulated side-band, and means for artificially changing the effective time interval from the said time interval over which the said signal information is actually received and for simultaneously changing the actual values of the signal information frequency or frequencies as applied to the said modulator.

2. Apparatus as claimed in claim 1 and in which the said signal-receiving means comprises recording means for recording the signal information and provided with the time-interval changing means comprising variable-speed-reproducing means for reproducing the same.

3. Apparatus as claimed in claim 1 and in which the said signal information is outside the audible range.

4. Apparatus as claimed in claim 1 and in which the said signal information is outside the range of real-time visual detectability.

5. Apparatus as claimed in claim 1 and in which the said readily detectable frequency is greater than the frequency or frequencies of the signal information.

6. Apparatus as claimed in claim 5 and in which the said carrier frequencies are radio frequencies.

7. Apparatus as claimed in claim 5 and in which the changing means comprises means for artificially increasing the said time interval and reducing the signal-information frequency or frequency band in the transposed side-band.

8. Apparatus as claimed in claim 7 and in which the changing means comprises means for artificially decreasing the said time interval and increasing the signal-information frequency or frequency band in the transposed side-band.

9. Apparatus as claimed in claim 1 and in which the receiving means comprises echo-receiving and electrical-signal-transducing apparatus.

10. Apparatus as claimed in claim 1 and in which the said signal information comprises a modulation upon one of the group of an acoustic and electromagnetic wave.

References Cited by the Examiner

UNITED STATES PATENTS

| 2,455,475 | 12/1948 | Eilenberger | 340—6 X |
| 2,534,060 | 12/1950 | Roberts | 325—311 X |
| 2,573,748 | 11/1951 | Weinstein et al. | 340—16 X |
| 2,658,138 | 11/1953 | Samuelson | 325—334 |
| 3,145,341 | 8/1964 | Andrew | 325—472 |

OTHER REFERENCES

"An Underwater Communication System," by N. D. Miller, IRE Transactions on Communication Systems, vol. CS-7, No. 4, December 1959 (pp. 249–251 relied on).

"Getting High Range Resolution With Pulse Compression Radar," by G. P. Ohman, Electronics, Oct. 7, 1960 (pp. 53–57 relied on).

CHESTER L. JUSTUS, *Primary Examiner.*